United States Patent [19]

Hasquenoph et al.

[11] 4,182,502
[45] Jan. 8, 1980

[54] DEVICE FOR THE BEARING HARMONIZATION OF AN AIRBORNE LOAD

[75] Inventors: Jean H. Hasquenoph, Lagny sur Marne; Pierre F. Coutin, Paris, both of France

[73] Assignee: R. Alkan & Cie, Valenton, France

[21] Appl. No.: 850,883

[22] Filed: Nov. 14, 1977

[30] Foreign Application Priority Data

Nov. 16, 1976 [FR] France ............................... 76 34428
Nov. 3, 1977 [FR] France ............................... 77 33061

[51] Int. Cl.² .............................................. B64D 1/02
[52] U.S. Cl. ..................................... 244/137 R; 89/156
[58] Field of Search ............... 244/137 R; 89/1.5 R, 89/1.5 C, 1.5 F, 1.5 G, 1.5 H; 294/83 R, 83 AE

[56] References Cited

U.S. PATENT DOCUMENTS

| | | | |
|---|---|---|---|
| 3,784,132 | 1/1974 | Newell | 244/137 R |
| 3,954,233 | 5/1976 | Hasquenoph et al. | 244/137 R |

FOREIGN PATENT DOCUMENTS 2261173  6/1974  Fed. Rep. of Germany ...... 244/137 R

*Primary Examiner*—Barry L. Kelmachter
*Attorney, Agent, or Firm*—William Anthony Drucker

[57] ABSTRACT

This device incorporated in a release or ejector mechanism for adjusting the transverse direction of an airborne load comprises a device for pivoting thereon the load-supporting hook and a bell crank linkage system, whether the load is equipped with a so-called saddle member or with standard rings. This device comprises essentially a cylindrical body formed either with an eccentric portion or with a transverse screw for performing the necessary adjustment, and a lock nut for firmly maintaining the selected adjustment position.

11 Claims, 6 Drawing Figures

DEVICE FOR THE BEARING HARMONIZATION OF AN AIRBORNE LOAD

BACKGROUND OF THE INVENTION

Field of the Invention

This invention relates in general to devices for lining up airborne loads with the aircraft and has specific reference to the application of devices of this kind to load release or launching devices of the type now in current use on various aircraft types.

When the use of an airborne load requires a high degree of precision with respect to an aircraft reference axis, so-called harmonization devices for setting or adjusting the site and bearing values must be used.

More particularly, the present invention is directed to provide a satisfactory solution to the problem of adjusting airborne loads comprising anchoring members either of the so-called "saddle" type or of the standard ring type. As a rule, these loads are suspended by means of so-called release or ejector devices comprising a launching or ejection mechanism having characteristics consistent with the specific nature and conditions of use of the airborne load. The definition of such mechanisms is obtained only at the cost of extended calculations and practical tests both on the ground and under varius flying conditions and if in certain cases a bearing adjustment device is to be incorporated in this mechanism it is obviously essential to preserve the previously adjusted initial mechanism.

SUMMARY OF THE INVENTION

It is the primary object of the present invention to meet this requirement by incorporating in a release or ejector mechanism a device capable of adjusting the position in a transverse direction of the load supporting hooks of the release device, without modifying the release mechanism proper, notably the means actuating said hooks. The device according to the present invention is also designed to permit the suspension of loads equipped either with so-called, "saddles" or with standard rings, so that this adjustment device will preserve the advantageous feature of utilizing as required both types of suspension means with a release or ejector device of the type disclosed in the U.S. Pat. No. 4,102,520 issued to the same Applicants.

DESCRIPTION OF THE PREFERRED EMBODIMENTS

Figure 1:
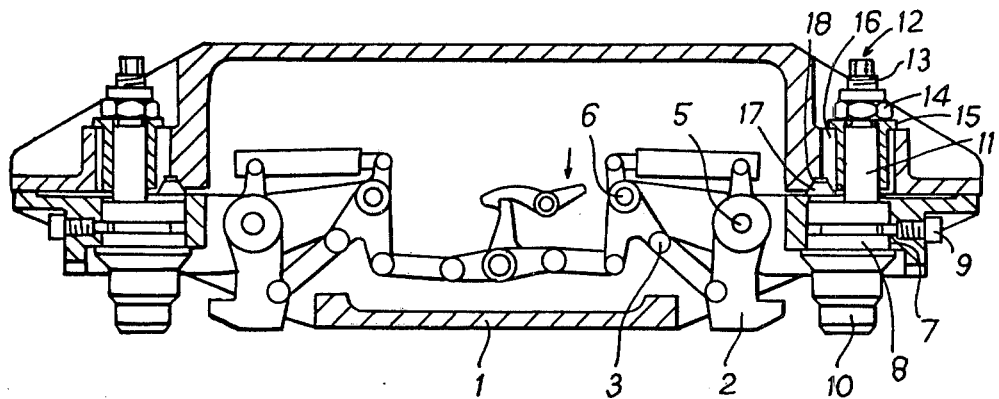
FIG. 1 is a vertical longitudinal section showing a release device according to this invention, equipped with anchoring or suspension and positioning means for suspending load equipped with "saddle" type members.

In the FIGS. 1 to 4 of the drawing, the reference numeral 1 designates diagrammatically the housing or frame structure of the release or launching device. The double hook corresponding to the so-called "saddle" member likely to equip the load is visible at 2 in FIGS. 1 to 3, the reference numeral 3 designating the effort scaling-down knee-action usually associated with the hook.

In the FIG. 1, the reference numeral 4 designates a supporting block comprising at 5 the pivot pin of hook 2 and at 6 the pivot pin of knee-action 3. This knee-action 3 is connected to the other component elements of the release and wedging mechanism. The supporting block 4 also comprises a bore 7 in which a member 8 is adapted to rotate while being held against any axial movement by a set screw 9. The lower cylindrical portion 10 of member 8 constitutes the male centering stud usually employed in conjunction with the aforesaid saddle members. The upper and likewise cylindrical portion 11 of member 8 is eccentric in relation to the lower portion 10 and comprises a hexagonal-sectioned drivable upper extension 12 (or any other equivalent element adapted to be conveniently rotated) under which a screw-threaded portion 13 of said member 8 is adapted to be engaged by a lock nut 14. The eccentric cylindrical portion 11 of member 8 is adapted to rotate in the corresponding bore formed in a socket 15 movable in a longitudinal slot of the frame or housing 1 of the release device.

With this arrangement, a controlled rotation of member 8, after releasing the lock nut 14, will permit a properly guided movement of block 4 on either side of the longitudinal median plane of the release structure 1 due to the member 8 having its lower portion journalled in the block 4, and its upper portion 11 journalled in socket 15 for rotation about an axis which is eccentric of but parallel to the axis of rotation of the lower portion. This eccentricity also requires socket 15 to be movable longitudinally in slot 16. The socket 15 can only move longitudinally in the slot 16. This movement of block 4 may be a straight sliding movement guided by a packing strip 17 secured to the block 4 and disposed transversely at right angles to the longitudinal median plane of the ejector and adapted to slide with minimal clearance in a corresponding slideway or groove 18 formed in the release structure 1. The adjustment movement of this block 4 may also be a circular movement about a vertical axis lying in the median plane of the ejector and in this case this movement is guided by an arcuate packing strip secured to the block 4 and in a matching arcuate groove, both the strip and the groove being centered on the vertical axis of rotation of this adjustment movement. The adjustment rotation of member 8 is obtained by using a spanner engaging the hexagonal upper extension 12 of member 8.

Thus, the adjustment movement accomplished by this block 4 will produce a simultaneous shifting of the lower cylindrical portion 10 of member 8, of hook 2 and of knee-action 3 in relation to the corresponding elements disposed at the opposite end of the release, and it is clear that the amplitude of this shifting movement and therefore the desired harmonization are subordinate to the angle through which the upper hexagonal extension 12 of member 8 is rotated. When this rotational adjustment is completed, the assembly is locked in the selected position while taking up any play by simply tightening the nut 14.

Figure 2:
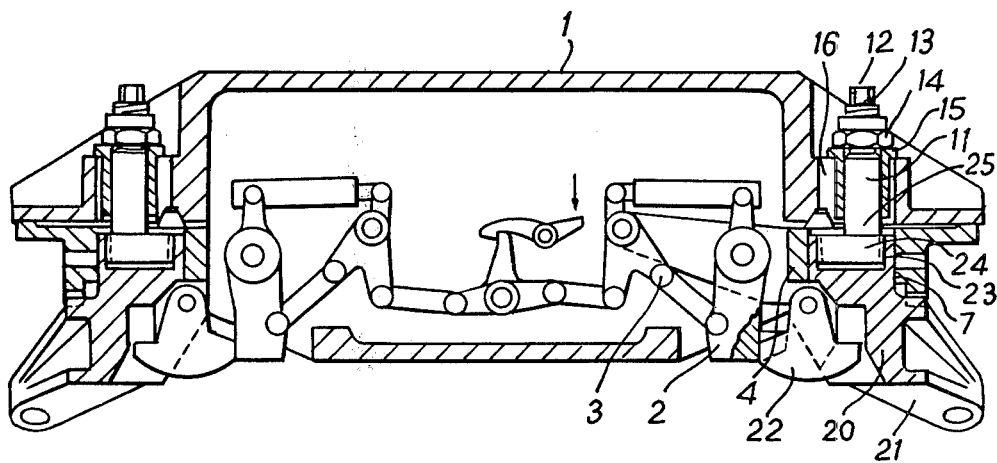
FIG. 2 is a vertical longitudinal section with one part shown in perspective, illustrating a release device similar to the device shown in FIG. 1 but provided with suspension, positioning and locking means designed for carrying loads equipped with standard suspension rings.

FIG. 2 illustrates the same release structure but equipped with a member 20 substituted for the member of FIG. 1; this member 20 is centered in bore 7 of supporting block 4 and comprises on the one hand a pair of symmetrical lateral bearing arms 21 and on the other hand a hook 22 corresponding to the standard ring provided on a load suspended from a pair of rings adjacent its opposite longitudinal ends. This member 20 will thus correspond to the similar member disclosed with reference to FIG. 2 of the U.S. Pat. No. 4,102,520 issued to the same Applicants, mentioned in the preamble of the present application, but comprises an internally screw-threaded portion 23 adapted to be engaged by the lower screw-threaded cylindrical portion 24 of eccentric member 25 of which the upper portion designated by the reference numeral 11 as in the case of member 8 in FIG. 1 is rotatably mounted in the bore of socket 15. The eccentric member 25 is also provided at its upper end with a hexagonal drivable extension 12 underlying which is a threaded portion 13 receiving a lock nut 14, so that by properly releasing this nut 14 the portion 11 of the eccentric member can be rotated together with the screw-threaded portion 24 in the matching tapped hole 23 of member 20.

Of course, the mode of operation of this device during an adjustment is the same as the one described hereinabove in connection with member 8 with reference to FIG. 1, i.e. when the operator rotates the drivable hexagonal extension 12, the supporting block 4 and therefore the elements solid therewith are shifted transversely because whilst the upper portion 11 is constrained, by the slot 16, to move only linearly, the eccentricity of the lower portion 24 causes the member 20 to be moved transversely. The assembly is also locked by tightening the nut 14 when the desired harmonization is obtained.

Figure 3:
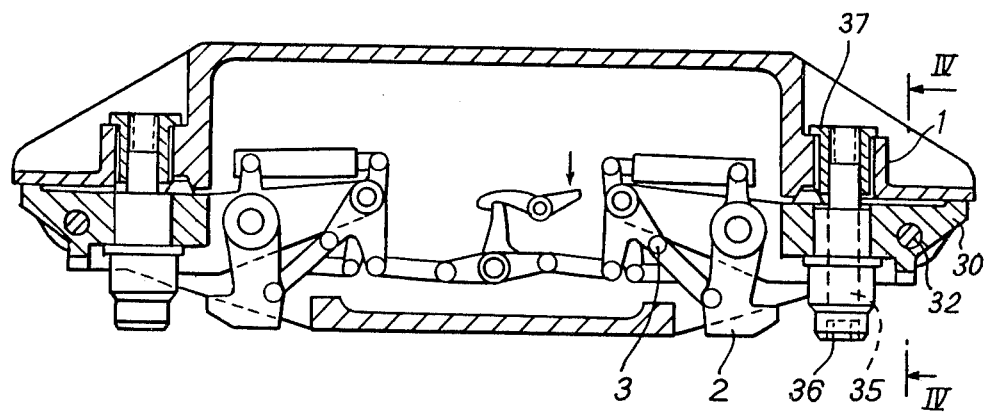
FIG. 3 illustrates in vertical longitudinal section the release device of which the bearing harmonization is obtained by means of a transverse screw.
Figure 4:
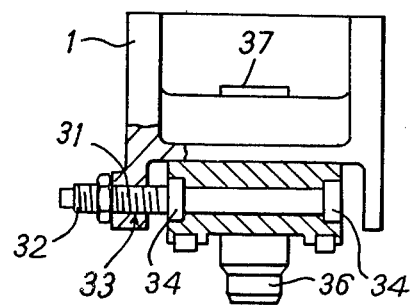
FIG. 4 illustrates in cross-sectional view taken along a vertical plane containing the axis of the transverse adjustment screw the portion of the release device shown in FIG. 3, the section being taken along the line IV—IV of FIG. 3.

If the access to the upper portion of the eccentric member is difficult or impossible, this invention provides a different arrangement for controlling the transverse movement of translation of block 4, for example by means of a horizontal transverse screw to which access can be had from one side of the release, as shown in FIGS. 3 and 4. In these Figures, the release frame structure or housing is also shown at 1 but as formed through one side wall a tapped hole 33 along a transverse horizontal axis 31 which is engaged by a screw 32 retained in the adjustable supporting block 30 by means of a pair of stop members 34. It will be readily understood that rotating the screw 32 through any suitable means, for example a spanner, will produce a transverse movement of supporting block 30 corresponding to the block 4 of FIGS. 1 and 2, this block also carrying the pivot pins of hook 2 and knee-action 3, respectively. In this case, the adjustable supporting block 30 is locked by tightening the screw 35 consisting for example of a standard recessed or socketed hexagonal head 36. This screw 35 has a vertical axis and engages the nut 37 solid with the frame structure or housing 1 of the release device and its operation does not require any access to the upper portion of the device. When the screw 35 is tightened, it pulls the nut 37 downwardly, and the block 30 and housing 1 are thereby clamped together to immobilise the block 30.

In the case of loads equipped with a pair of saddle type members which are spaced by a determined distance in the longitudinal direction, each saddle comprises a cylindrical cavity for receiving a centering stud of the release or load supporting device. When, according to the present invention, one of the centering studs is offset from the median longitudinal plane of the load supporting device by a linear translation which is perpendicular to such plane as indicated in reference to FIG. 1, the distance between the axes of the two centering studs increases and does no longer correspond with the distance between the axes of the cavities of the load saddles. This is because, viewed in plan, the distance between the axes of the cavities is the hypotenuse of a triangle of which the other two sides are respectively (i) the spacing of the saddle cavity axes along the median longitudinal plane, and (ii) the spacing of one of the cavity axes from the median longitudinal plane. Between the studs and the cavities, it is possible to provide a clearance allowing to accept the difference between the distance of the stud axes and the distance of the cavity axes but such clearance goes against the desired precision for the position of the load. Therefore, the present invention comprises a particular arrangement of one of the two studs such as 10 allowing such stud to have its lower end received into the corresponding cavity with a minimal clearance while the advantage of the load adjustment in azimuth is maintained.

For the above result, it is provided, according to the present invention, that one of the centering studs 10 comprises an additional cylindrical member adapted to slide longitudinally in the median longitudinal plane, but not transversely thereof, in order to come straight above the corresponding cavity and to be received therein with a minimal clearance. It will be appreciated that one of the centering studs remain in one piece and maintains the load longitudinally as well as transversely whereas the other stud, provided with the additional sliding member, maintains the load only in the transverse direction owing to the possibility of the longitudinal sliding, but however the longitudinal transverse movements of the load as well as its rotational movement about a vertical axis are both made impossible by the combined locating effect of the two studs. The centering stud equipped with the sliding member according to the above complementary arrangement will be preferably that stud which is not transversely offset according to the main feature of the invention.

Figure 5:
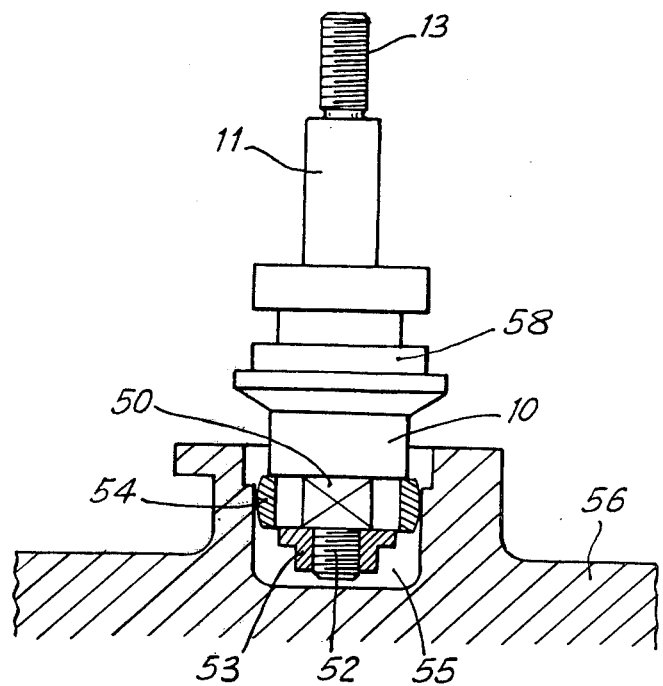
FIG. 5 is a side view of a centering stud with a sliding member in longitudinal section for centering with a minimal clearance a suspended load equipped with saddle type members.

According to a particular feature of the above arrangement, the insertion of the stud with a sliding cylindrical member into the corresponding cavity and its removal without any jamming are made easier by an axially curved anter face of the sliding member, see member 54 in FIG. 5.

The above additional arrangement is also advantageous for maintaining the load without any excessive clearance by accepting the differences between the spacing of the cavity axes and the spacing of the studs which are due either to the manufacturing tolerances of the load and load supporting device or to important changes of temperature applied to aircrafts and having different effects upon the load and the load supporting device.

Figure 6:
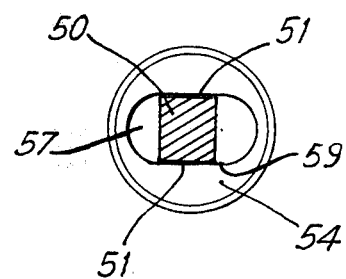
FIG. 6 is a horizontal section showing the sliding member from above.

An example of the above arrangement is shown in FIGS. 5 and 6.

In FIG. 5, the centering stud 10 may be the lower portion of a member 58 which is similar to the member 8 of FIG. 1 but is not eccentric with respect to the upper part 11 with a screw-threaded portion 13 for securing the stud in the load supporting device. The lower part of the stud 10 comprises a prismatic reduced portion 50 of rectangular cross section with lateral sides 51 which are parallel to the longitudinal load axis and its low end 52 is screw-threaded for receiving a nut 53 which is adapted to retain the sliding toroidal member 54 according to the present arrangement. The member 54 is adapted for being inserted into a cavity 55 of the load to be fixed in the desired position. The member 54 has an elongated diametral aperture 57 in the longitudinal direction having parallel sides 59 between which the part 50 extends.

It will be appreciated that the centering stud shown on FIG. 5 is preferably that stud which is not offset transversely, in such a manner that the upper part 11 is shown without being eccentric relatively to the lower part of the stud 10. The stud is locked in such a direction that the sides 51 be parallel to the longitudinal axis of the complete device.

The simplicity of the device allows to understand its operation immediately. The toroidal member 54 enters into the cavity 55 with a minimal clearance and has peripheral contact therewith, while taking its required position with respect to the stud 10 since it can slide along the lateral parallel sides of the reduced part 50 of the stud. The contact between the stud part 50 and the sliding member 54 is ensured by the plane surfaces 51–59 which are relatively large. In brief, the member 54 can move, within limits, relative to the stud 10 in the longitudinal direction of the aircraft, by reason of the elongation of aperture 57, but there is no possibility of relative transverse movement.

It will be readily understood that the various forms of embodiment described hereinabove should not be construed as limiting the scope of the present invention since various modifications and changes may be brought thereto without departing from the basic principles of the invention as set forth in the appended claims.

What we claim is:

1. In a system for releasably suspending a load from an aircraft, having a housing structure carried by the aircraft, a pair of longitudinally spaced hooks within said housing and pivotally movable between a position engaging the load for the suspension thereof and a position releasing said load, and link means connected to said hooks for controlling the pivotal movement thereof, the improvement which consists of a device for adjusting in a horizontal plane the position of the suspended load, said device comprising:
    (i) a screw engaging a tapped hole formed through a side wall of said housing structure along a transverse horizontal axis,
    (ii) a supporting block rigid with said screw and on which are pivoted one of said hooks and a bell crank linkage controlling the pivotal movement of said hook, and
    (iii) means for locking said supporting block in relation to the housing structure, rotation of said screw causing a transverse movement in an horizontal plane of said one hook.

2. In a system for releasably suspending a load from an aircraft, having a housing structure carried by the aircraft, a pair of longitudinally spaced hooks within said housing and pivotally movable between a position engaging the load for the suspension thereof and a position releasing said load, and link means connected to said hooks for controlling the pivotal movement thereof, the improvement which consists of a device for adjusting in a horizontal plane the position of the suspended load, said device comprising:
    (i) a socket movable in a longitudinal slot of said housing structure,
    (ii) a rotatable member having a cylindrical upper part rotatably engaged through said socket and a cylindrical lower part eccentric in relation to said upper part;
    (iii) a supporting block secured for translation to said lower part and on which are pivoted one of said hooks and a bell crank linkage controlling the pivotal movement of said hook, said hook being a double hook adapted to co-act with a saddle member of the load,
    (iv) a transversely disposed packing strip rigid with said supporting block and guided in a groove transversely formed in said housing structure, and
    (v) means for locking said rotatable member in relation to the housing structure, rotation of said rotatable member causing a transverse movement in an horizontal plane of said one hook.

3. A system, as claimed in claim 2, wherein said supporting block also carried symmetrical lateral bearing arms for ensuring wedging of the load.

4. A system, as claimed in claim 2, wherein said cylindrical lower part of said rotatable member has a lower extension in the form of a centering stud adapted to be inserted in an upper cavity of said load saddle.

5. System, as claimed in claim 2, wherein an additional hook is pivoted to said supporting block, said additional hook co-acting with said one hook and being adpated to carry a load equipped with standard rings.

6. A system, as claimed in claim 4, wherein said centering stud is provided with a longitudinally slidable member adapted for being inserted into said saddle upper cavity in such a manner that the movement of said slidable member permits an easy insertion thereof into said saddle cavity when a transverse movement of said centering stud has taken place.

7. A system, as claimed in claim 6, wherein said slidable member has a toroidal shape the external diameter of which corresponds with the internal diameter of the saddle cavity for easy insertion of said slidable member into said cavity with minimal clearance.

8. A system, as claimed in claim 7, wherein the slidable member has an elongated aperture with parallel longitudinal sides in contact by relatively large surfaces with external longitudinal sides of a prismatic part of the centering stud adapted to pass through said aperture.

9. A system, as claimed in claim 4, wherein a second centering stud is associated with the other hook of said pair of hooks, said second centering stud being provided with a longitudinally slidable member adapted for being inserted into a corresponding saddle cavity in such a manner that the movement of said slidable member permits easy insertion thereof into said corresponding saddle cavity when a transverse movement of the lower part of the rotatable member has taken place.

10. A system, as claimed in claim 9, wherein said slidable member has a toroidal shape the external diameter of which corresponds with the internal diameter of the corresponding saddle cavity for easy insertion of said slidable member into said corresponding cavity with minimal clearance.

11. A system, as claimed in claim 10, wherein said slidable member has an elongated aperture with parallel longitudinal sides in contact by relatively large surfaces with external longitudinal sides of a rectangular sectioned part of the second centering stud adapted to pass through said aperture.

* * * * *